Dec. 10, 1940.  E. F. FISHER  2,224,429
WET TYPE DUST COLLECTOR
Filed Sept. 8, 1937
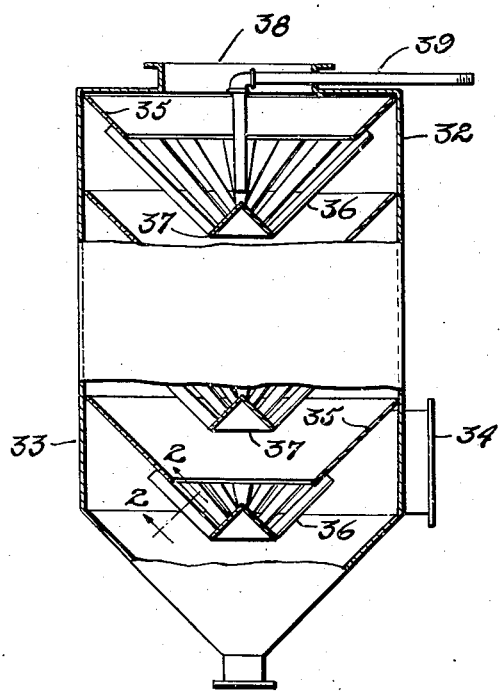
Fig. 3.
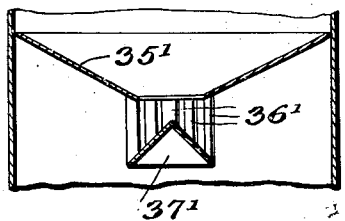
Fig. 2.
Fig. 1.
Inventor
Ernest F. Fisher,
By Raymond Jones
Attorney.

Patented Dec. 10, 1940

2,224,429

UNITED STATES PATENT OFFICE 2,224,429

WET TYPE DUST COLLECTOR

Ernest F. Fisher, Springfield, Ill.

Application September 8, 1937, Serial No. 162,927

4 Claims. (Cl. 183—21)

This invention relates to a wet-type dust collector and, more particularly, to a device adapted to remove solid particles from a stream of air which has entrained dust from various sources or has been exposed to a unit operation, such as paint spraying, sand blasting or the like, by the step of washing the particles from a volume of air as it passes vertically through a liquid spray adapted to entrain the particles and thereby cleanse the air.

The main object of the invention is to provide a dust collector that is simple in construction, economical to manufacture and efficient in operation.

Another object of the invention is to provide a dust collector that is adapted to remove entrained particles from a vortically travelling volume of air by means of a liquid spray.

A further object of the invention is to provide a dust collector comprising means for producing intimate contact between a dust bearing air stream and a liquid spray.

Other objects and advantages will become apparent in the specification which follows and the disclosure of the drawing, wherein—

Fig. 1 is a view, in section, of a wet-type dust collector constructed according to my invention.

Fig. 2 is a view, in section, on line 2—2 of one of the stator blades.

Fig. 3 shows a modified form of stator blades.

In Fig. 1, the dust collector is shown as a cylindrical tower 32 divided into a plurality of sections, or compartments. The bottom section 33 thereof is provided with a tangentially arranged dust bearing air inlet 34. A diaphragm 35 formed in the shape of an inverted frustum of a cone is secured inside each tower section, preferably by welding at a point adjacent the top thereof. Each diaphragm is provided at its lower opening with an inverted frustro-conical cage of stator blades which provide intimate contact between the dust bearing air and the liquid spray.

The cage is formed of a plurality of blades 36 which may taper in width, becoming narrower at the lower end, although shown in the drawing as being of uniform width. The blades are arcuate or warped in cross section as shown in Fig. 2. The blades are secured at one end, preferably by welding, to the lower opening of the diaphragm. The lower ends of the blades are secured to the base of a conical baffle plate 37, the apex of which is located at a point within the cage of stator blades. The area of the air opening inlets between the stator blades is substantially the same as that of the air inlet 34 in the lower tower section.

The intermediate tower sections are constructed similar to the lower section. Each section is cylindrical and is provided with a diaphragm 35 and a cage of stator blades 36 as described above. The tower sections are secured together in any suitable manner. Although certain cages of blades are shown as projecting downwardly and within a diaphragm therebelow, the cages may be made shorter or longer as desired.

The top section of the dust collector is cylindrical in shape and is provided with an air outlet opening 38 in the top thereof. A water pipe 39 extends into the tower section to the center thereof and downwardly to a point adjacent the apex of the conical plate 37 of the upper cage of baffles. If desired, a spray head may be arranged on the outlet end of the pipe so as to direct the water against the blades 36.

The cage of blades in the top tower section differs from those in lower sections in that the warp of the blades is opposite to that of the blades immediately below. The blades, so arranged, serve to remove any water entrained by the air. Further, the blades of the upper section are of greater length than those immediately below. This arrangement of blades provides a large outlet area, thereby cutting the velocity of the air.

In operation, dust bearing air is admitted to the tower through the inlet in the bottom section tangentially to the side wall to form a vortex. The air stream then passes upwardly through the several sections of the tower. In so doing, it strikes the blades mounted in the openings of the diaphragms which increase its whirling vortical motion and, at the same time, divide the main air stream into a large number of smaller streams, thereby intimately contacting the air with the spray of water supplied by the water pipe at the top of the tower. The cleansed stream of air flows into the top section of the tower where it encounters the cage of blades which are warped reversely to the blades immediately below. These blades function to baffle and remove any water particles entrained in the air stream. The clean air then passes through the tower and separated solid particles from the air collect in the bottom of the tower and pass through the outlet therein to a settling tank or other suitable means.

Fig. 3 shows a modification of the diaphragm and blade structure previously described in connection with the apparatus shown in Figure 8 wherein a series of blades 36' are arranged to be spaced to form a cylindrical shaped cage. These blades are secured at their upper ends to a diaphragm 35' which may be frusto-conical in shape as shown in Fig. 1 positioned in a transverse plane. The lower ends of the blades are secured to a conical shaped baffle or deflector plate 37'. The blades 36' are of the warped or twisted type as shown in cross section in Figure 2.

What I claim is:

1. A wet type dust separator comprising a tower section, a frusto-conical diaphragm in said section, a plurality of spaced elongated blades, each secured at one end to the lower surface of said diaphragm, a conical baffle secured at its base to the free ends of the spaced elongated blades with the apex of the plate directed upwardly, means for supplying dust laden air adjacent the lower end of said section, means for spraying liquid into the upper end of said section and an outlet for cleansed air adjacent the upper end of said section.

2. A wet type dust separator comprising a tower section, a frusto-conical diaphragm in said section, a plurality of spaced elongated blades each secured at one end to the lower end of said diaphragm, said blades extending inwardly at an angle to the vertical axis of said section to form a conical element, a conical baffle plate positioned with its apex within the conical element formed by said blades and secured at its base to the free ends of each of the spaced elongated blades with the apex of the plate directed upwardly, means for supplying dust laden air adjacent the lower end of said section, means for spraying liquid into the upper end of said section and an outlet for cleansed air adjacent the upper end of said section.

3. In a wet type dust separator as set forth in claim 2, said means for spraying liquid into the upper end of said section comprising a liquid supply jet positioned centrally of the section and having its outlet adjacent the apex of said conical baffle plate, whereby to supply liquid to said conical baffle plate.

4. A wet type dust separator comprising a tower section, a frusto-conical diaphragm in said section, a plurality of spaced elongated blades, each secured at one end to the lower end of said diaphragm, said blades extending vertically downward to form a cylindrical element, a conical baffle plate positioned with its apex within the cylindrical element formed by said blades and secured at its base to the free ends of each of the spaced elongated blades with the apex of the plate directed upwardly, means for spraying liquid into the upper end of said section comprising a liquid supply jet positioned centrally of the section and having its outlet adjacent the apex of said conical baffle plate, whereby to supply liquid to said conical baffle plate, and an outlet for cleansed air adjacent the upper end of said section.

ERNEST F. FISHER.